US 9,240,883 B2

(12) United States Patent
Chew

(10) Patent No.: US 9,240,883 B2
(45) Date of Patent: *Jan. 19, 2016

(54) MULTI-KEY CRYPTOGRAPHY FOR ENCRYPTING FILE SYSTEM ACCELERATION

(75) Inventor: Yen Hsiang Chew, Penang (MY)

(73) Assignee: Intel Corporation, Santa Clara, CA (US)

(*) Notice: Subject to any disclaimer, the term of this patent is extended or adjusted under 35 U.S.C. 154(b) by 748 days.

This patent is subject to a terminal disclaimer.

(21) Appl. No.: 13/292,883

(22) Filed: Nov. 9, 2011

(65) Prior Publication Data

US 2012/0057696 A1    Mar. 8, 2012

Related U.S. Application Data

(63) Continuation-in-part of application No. 12/204,658, filed on Sep. 4, 2008.

(51) Int. Cl.
*H04L 9/00* (2006.01)
*H04L 9/08* (2006.01)
*G06F 21/62* (2013.01)
*H04L 9/14* (2006.01)

(52) U.S. Cl.
CPC .......... *H04L 9/0825* (2013.01); *G06F 21/6209* (2013.01); *G06F 21/6218* (2013.01); *H04L 9/0822* (2013.01); *H04L 9/0894* (2013.01); *H04L 9/14* (2013.01); *G06F 2221/2107* (2013.01)

(58) Field of Classification Search
CPC ............ H04L 63/0457; H04L 63/0478; H04L 9/0825; H04L 9/0894; H04L 9/14; G06F 21/6209; G06F 21/6218; G06F 2221/2107

USPC ............................ 380/281, 284, 45; 713/165
See application file for complete search history.

(56) References Cited

U.S. PATENT DOCUMENTS 4,907,275 A    3/1990   Hashimoto
5,235,641 A    8/1993   Nozawa et al.
(Continued)

FOREIGN PATENT DOCUMENTS

EP    1288941 A2    3/2003
EP    1320011 A2    6/2003
(Continued)

OTHER PUBLICATIONS

International Search Report and Written Opinion, PCT/IB2012/002808, 9 pages. Mailed May 16, 2013.
(Continued)

*Primary Examiner* — Jung Kim
*Assistant Examiner* — Thomas Ho
(74) *Attorney, Agent, or Firm* — Blakely, Sokoloff, Taylor & Zafman LLP

(57) ABSTRACT

Embodiments of methods and systems for encrypting and decrypting with encryption attributes are presented. An encryption attribute contains information to identify one or more segments of a file to be encrypted. An encryption process encrypts those one or more segments to generate a partly encrypted file instead of encrypting the entire file. That is, the file includes some data that are encrypted and some data that are not. In one embodiment, at least three encryption keys are used such that the encryption attribute is encrypted with using a third key.

16 Claims, 7 Drawing Sheets

(56) References Cited

U.S. PATENT DOCUMENTS

| | | | |
|---|---|---|---|
| 6,249,866 B1 | 6/2001 | Brundrett et al. | |
| 6,381,331 B1 | 4/2002 | Kato | |
| 6,405,315 B1 | 6/2002 | Burns et al. | |
| 6,678,828 B1 | 1/2004 | Pham et al. | |
| 6,931,597 B1* | 8/2005 | Prakash | 715/741 |
| 6,941,456 B2 | 9/2005 | Wilson | |
| 6,971,022 B1 | 11/2005 | Katta et al. | |
| 7,260,555 B2* | 8/2007 | Rossmann | G06F 21/6209 705/50 |
| 7,320,069 B1 | 1/2008 | Sundharraj et al. | |
| 7,428,306 B2 | 9/2008 | Celikkan et al. | |
| 2004/0064688 A1 | 4/2004 | Jacobs | |
| 2004/0091114 A1 | 5/2004 | Carter | |
| 2006/0282674 A1* | 12/2006 | Saito | 713/176 |
| 2007/0143210 A1 | 6/2007 | Yeung | |
| 2007/0253549 A1* | 11/2007 | Celikkan | G06F 21/602 380/42 |
| 2009/0052670 A1 | 2/2009 | You et al. | |
| 2010/0054477 A1 | 3/2010 | Chew | |
| 2013/0159694 A1* | 6/2013 | Chiueh et al. | 713/150 |

FOREIGN PATENT DOCUMENTS

| | | |
|---|---|---|
| JP | 63287882 | 11/1998 |
| JP | 2000-0132543 | 5/2000 |
| JP | 2000-132543 | 5/2000 |
| JP | 2006094244 | 4/2006 |
| JP | 2008-067102 | 3/2008 |
| JP | 2008-516548 | 5/2008 |
| KR | 10-2011-0024788 | 11/1988 |
| KR | 1020040058296 | 7/2004 |
| WO | WO-99/14652 | 3/1999 |
| WO | WO-01/41357 | 6/2001 |
| WO | WO-03-055174 | 7/2003 |
| WO | WO-2005-071881 | 8/2005 |
| WO | WO-2007-028099 | 3/2007 |

OTHER PUBLICATIONS

European Search Report European Patent Application No. 12001128, 6 pages. Mailed May 25, 2012.

Notice of Preliminary Rejection for Korean Patent Application No. 10-2009-83538, Mailed Jan. 19, 2011, 11 pages.

Final Office Action for Korean Patent Application No. 10-2009-83538, Mailed Sep. 26, 2011, 7 pages.

Sabine Widera, Office Action, Feb. 10, 2010, 3 pages, European patent application No. 09 252 072.5-2212, European Patent Office, Munich, Germany.

Non-Final Office Action for U.S. Appl. No. 12/204,658, Mailed Aug. 17, 2011.

* cited by examiner

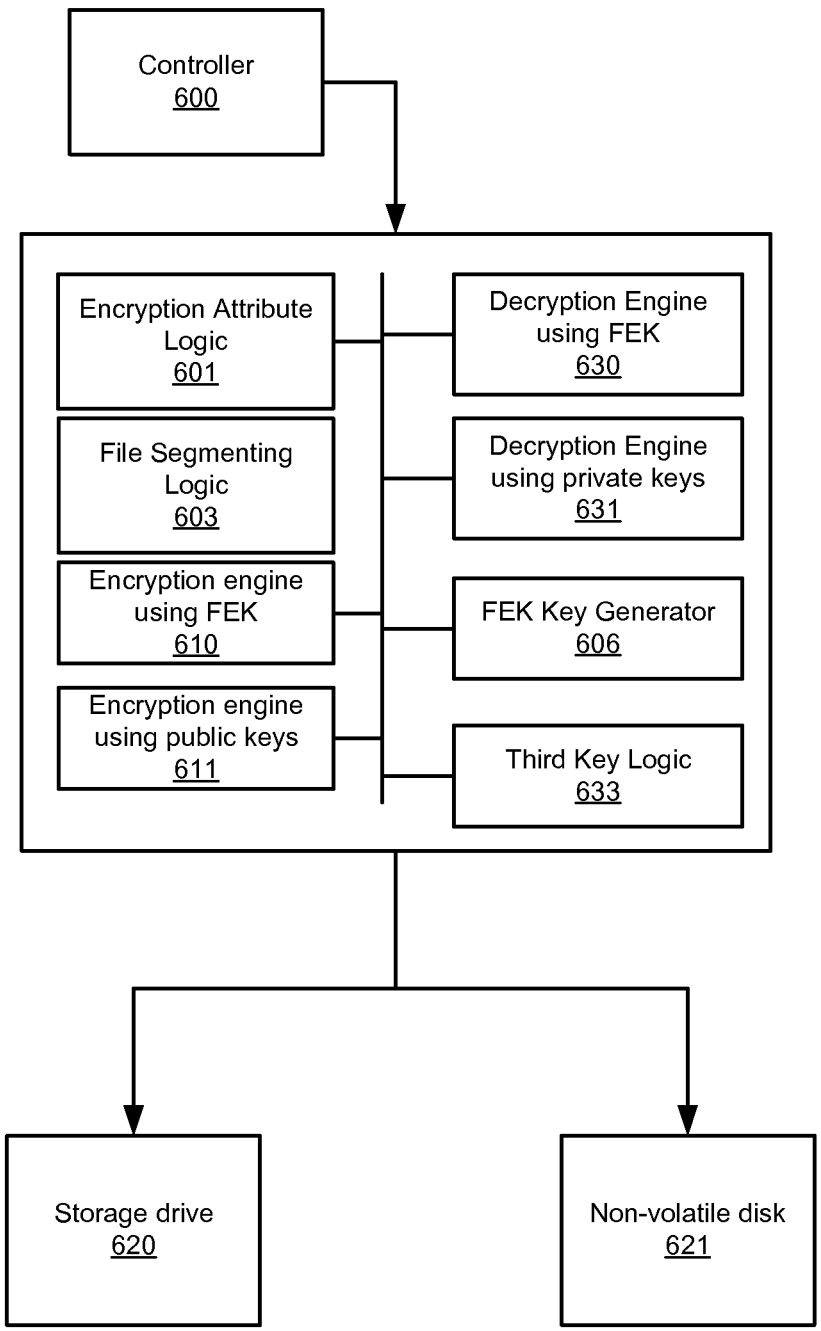

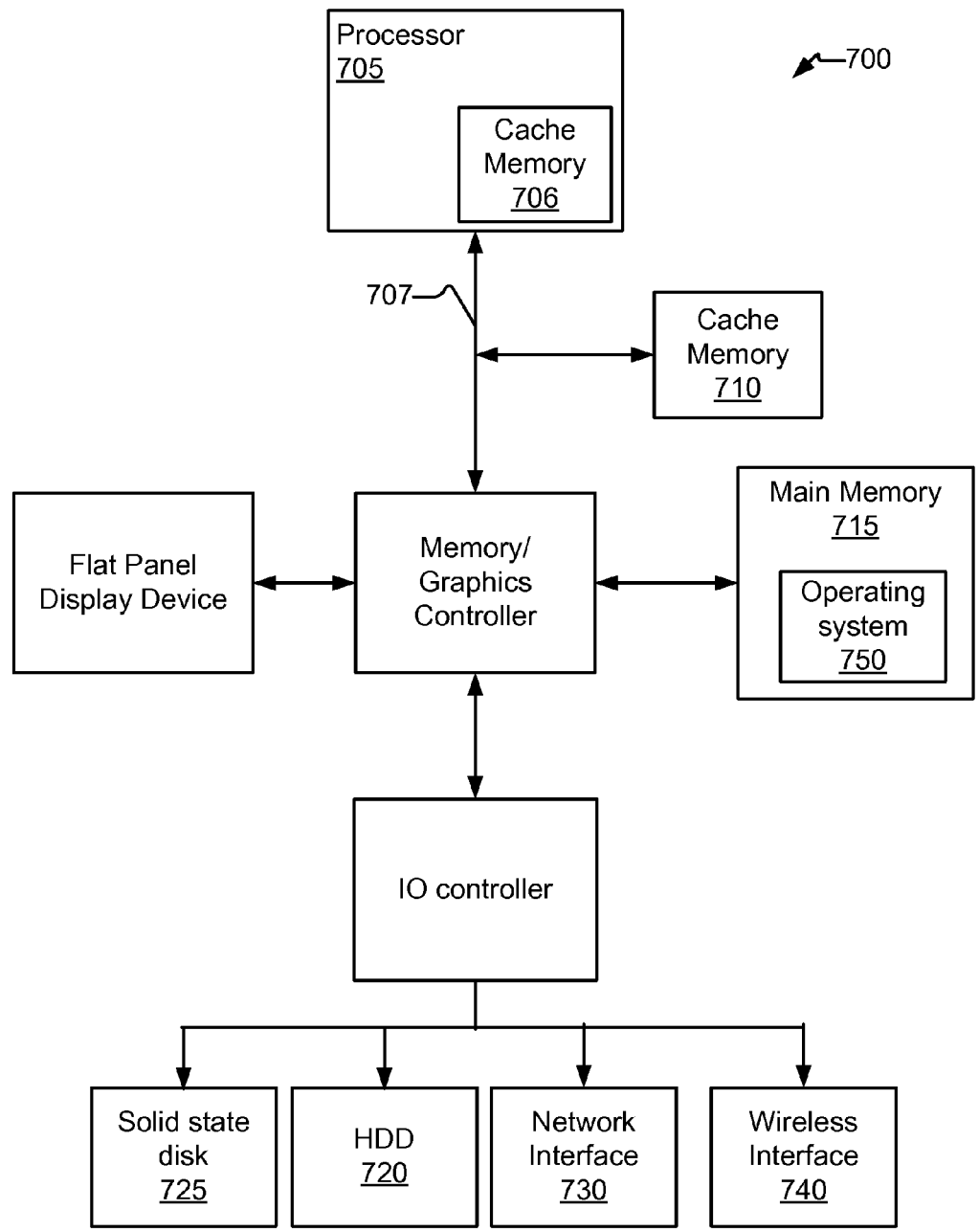

_US 9,240,883 B2_

MULTI-KEY CRYPTOGRAPHY FOR ENCRYPTING FILE SYSTEM ACCELERATION

CROSS-REFERENCE TO RELATED APPLICATIONS

This is a continuation-in-part of application Ser. No. 12/204,658, filed on Sep. 4, 2008, entitled "Accelerated Cryptography with an Encryption Attribute", and assigned to the corporate assignee of the present invention and incorporated herein by reference.

FIELD OF THE INVENTION

Embodiments of the invention relate to the field of content security, in particular, for encrypting and decrypting a data.

BACKGROUND OF THE INVENTION

Symmetric cryptography is a cryptography method in which both the encryption and decryption operations share the same key (or, less commonly, in which their keys are different, but related in an easily computable way). Examples of symmetric cryptography algorithms include Data Encryption Standard (DES) and Advanced Encryption Standard (AES).

On the other hand, public key encryption algorithms use asymmetric keys for encryption and decryption. The asymmetric keys comprise a private key (which is held only by its owner) and a public key (which is available to other entities). The two keys are separate but complementary in function. Information that is encrypted with the public key can be decrypted only with the corresponding private key. The two keys together are called a key pair or a key set. RSA algorithm is an example of public key encryption algorithms.

Encrypting File System (EFS) is a file system with encryption services. The technology transparently allows files to be encrypted and decrypted on a file system to protect confidential data from attackers with physical access to the computer. An EFS uses public key cryptography to ensure that decrypting a file without a correct key is in theory impossible, or requires an unreasonable length of time to crack.

An EFS works by encrypting a file with a symmetric key, also known as File Encryption Key (FEK). The FEK is then encrypted with a public key that is usually associated with a user and is available to third parties. To decrypt the encrypted file, the EFS uses a private key, accessed only by the user, to decrypt the encrypted FEK. The EFS then decrypts the file which is encrypted with the FEK. In general, these encryption and decryption operations are performed at a layer below an operating system so that it is transparent to users and to applications running thereon.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 6 is a block diagram of one embodiment of a cryptography system.

FIG. 7 illustrates a computer system in which one embodiment of the invention may be used.

DETAILED DESCRIPTION OF THE INVENTION

Figure 1:
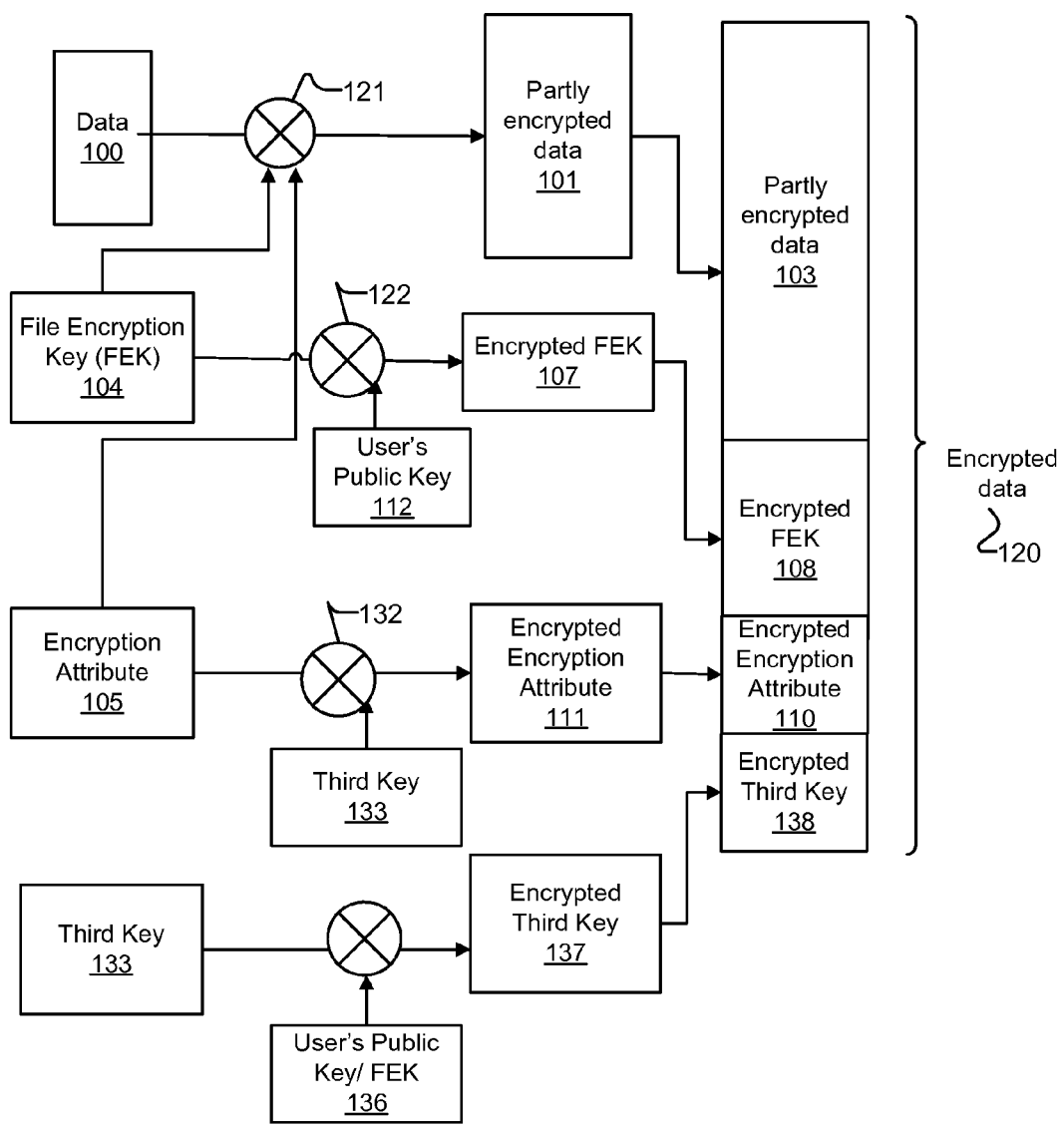
FIG. 1 is a data flow diagram illustrating the encryption of data in accordance with one embodiment of the invention.

Embodiments of methods and systems for encrypting and decrypting with encryption attributes are presented. An encryption attribute contains information to identify one or more segments of a file to be encrypted. An encryption process encrypts those one or more segments to generate a partly encrypted file instead of encrypting the entire file. That is, the file includes some data that are encrypted and some data that are not. In one embodiment, at least three encryption keys are used such that the encryption attribute is encrypted with using a third key.

In one embodiment, the decryption operation identifies those segments that are encrypted in the partly encrypted file with the information contained in the encryption attribute. In one embodiment, an authorized user, for example the owner of the file, sets the encryption attribute associated with a file to identify segments of the file that should be encrypted during an encryption operation.

In the following description, numerous specific details are set forth to provide a more thorough explanation of embodiments of the present invention. However, it is understood that embodiments may be practiced without these specific details. In other instances, well-known elements, specifications, and protocols have not been discussed in detail in order to avoid obscuring the embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a data flow diagram illustrating the encryption of data in accordance with one embodiment of the invention. Referring to FIG. 1, in one embodiment, the elements in an encryption process include data 100, file encryption key (FEK) 104, encryption attribute 105, encryption engines 121-122, public key 112, encrypted data 120, encryption engine 132, third key 133, encrypted third key 137, and encrypted third key 138.

In one embodiment, data 100 is a plaintext such as, for example, a media file, a text file, a data record of a database, or any form of digital information content. To encrypt data 100, encryption engine 121 receives FEK 104 as an encryption key and encryption attribute 105. Encryption attribute 105 contains information to identify one or more segments of data 100 to be encrypted. The result of encryption engine 121 is partly encrypted data 101. In one embodiment, FEK 104 is encrypted using encryption engine 122 with public key 112 which is associated with a user. The outputs from encryption engine 122 are encrypted FEK 107.

In one embodiment, encryption attribute 105 is encrypted by using encryption engine 132 with third key 133 which is different from the user's public key and FEK 104. Encrypted encryption attribute 111 is the output of encryption engine 132. In one embodiment, third key 133 is encrypted by an encryption engine with a user's public key or FEK 104 to generate encrypted third key 137.

In one embodiment, partly encrypted data 103, encrypted FEK 108, encrypted encryption attribute 110, and encrypted third key 138 are stored together in encrypted data 120. In one embodiment, the overall time for performing the encryption operation is reduced because not all segments of the data are encrypted. The increase of performance depends on how many segments of the data are identified for encryption based on the information in encryption attribute 105. In one embodiment, encrypted data 120 is stored on an EFS or a file system, or is transmitted to be stored/used in another computer system.

In one embodiment, data 100 is divided into segments where each segment is M-bit in length such that the length is equal to one of the block sizes of encryption engine 121. In one embodiment, block ciphers in encryption engine 121 process a 128-bit segment in each round of an operation. It will be appreciated by one skilled in the art that, any block size suitable for implementing encryption can be used to determine the length of a segment for segmenting data 100 for the encryption purpose.

In one embodiment, encryption attribute 105 is set to a default setting based on a category or a file type of data 100. The default setting can be modified by users, administrators, or both. In one embodiment, encryption attribute 105 contains information such as, for example: a list of numbers corresponds to the list of segments to encrypt, a rule or a set of rules to describe which segment(s) to encrypt, an identifier corresponds to such rule(s), a pointer to a location storing such rule(s) or such list of numbers, or any combinations thereof. It will be appreciated by one skilled in the art that information can present in encryption attribute 105 in different ways to identify which segments of data 100 are to encrypt. In one embodiment, encryption attribute 105 includes additional information such as information about authorized users and designated recovery agents.

In one embodiment, data 100 is an instance of certain types of files. Encrypting the header (or the first N segments) of the file is sufficient to protect the file from unauthorized usages. For example, the header includes information crucial to interpret the file format, such as, for example: parameters associated with a video encoding algorithm, parameters associated with an image encoding algorithm, data fields of a data structure, or other security measures in place to protect the file.

In one embodiment, encrypting certain segments of data 100 renders the data useless unless the encrypted segments are recovered. For example, a patient's medical history record is useless if the patient name and his/her identifier number are encrypted and hence protected from unauthorized access. The medical history record is not useful if one can not associate it with a particular patient.

In one embodiment, data 100, such as a file, is encrypted by encrypting several segments in every N segments of the file. For example, a video file encrypted with this pattern has some of the video frames protected from viewing. The viewer of the encrypted file is not able to enjoy the entire length of the video without interruption. The encrypted file is deemed to be not usable because of the discontinuity. In comparison, encrypting some segments of the video file saves a lot of computational time than encrypting the entire video file. The performance of the encrypting file system increases as the burden of encrypting and decrypting the entire media files is reduced.

In one embodiment, data 100 is a file. Encryption engine 121 encrypts a plurality of segments of the file, for example: the header of the file, segments of important parts of the file, alternate N segments of the file, or any combinations thereof, to protect the file from unauthorized access.

In one embodiment, encryption attribute 105 is attached to partly encrypted data 103 without being encrypted.

In one embodiment, encrypted encryption attribute 111 is appended to partly encrypted data 103. In one embodiment, encrypted encryption attribute 111 prepends partly encrypted data 103. In one embodiment, encrypted encryption attribute 110 is stored at a location associated to the partly encrypted data 103 according to the structure of a file system.

In one embodiment, encryption engine 121-122 are able to perform symmetric cryptography operations, asymmetric cryptography operations, or a combination thereof based on various cryptography algorithms (for example, AES, DES, RSA, etc.). The cryptography operations are implemented in block ciphers, stream ciphers, or any other cipher architectures known in the art.

Figure 2:
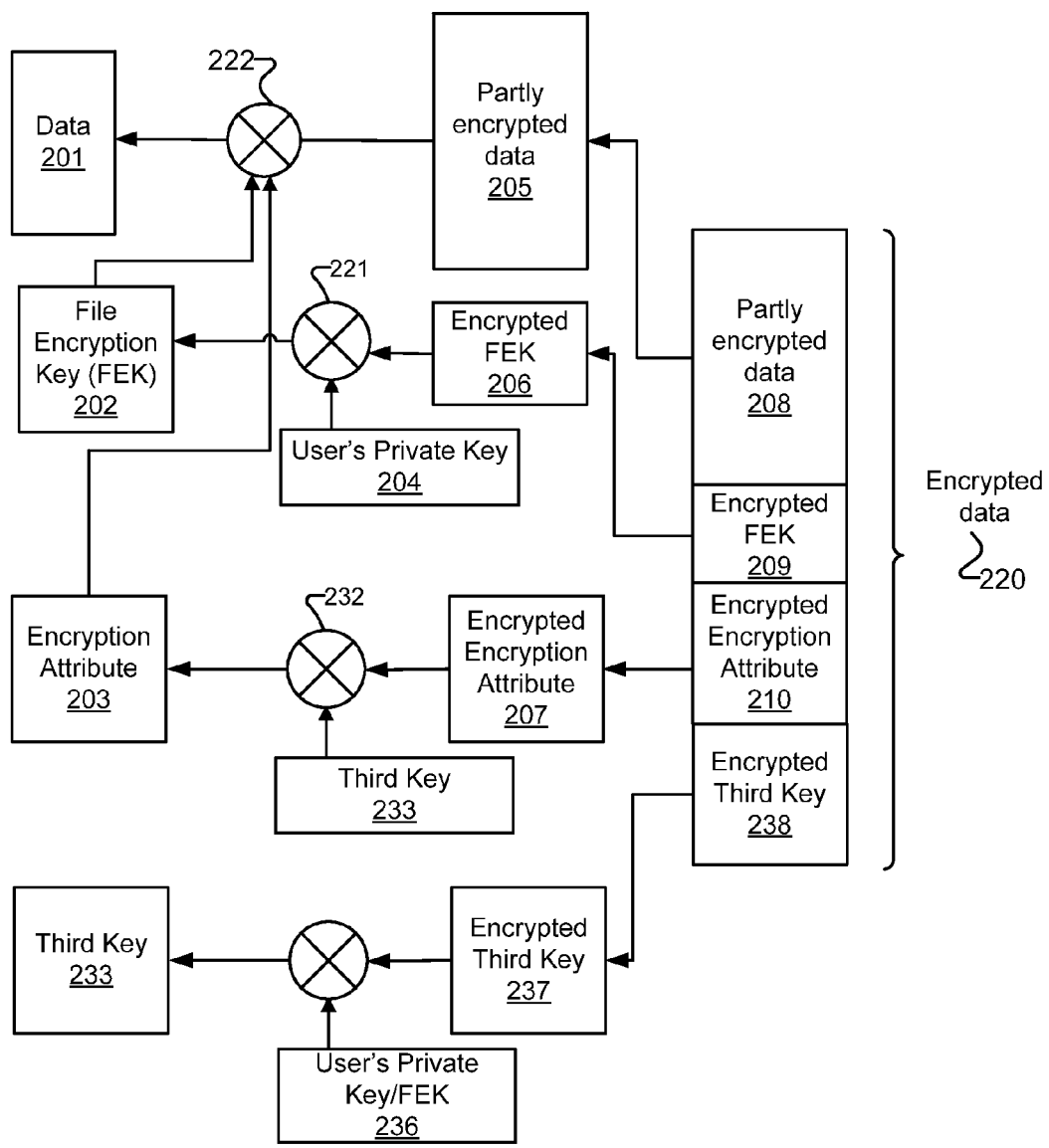
FIG. 2 is a data flow diagram illustrating the decryption of data in accordance with one embodiment of the invention.

FIG. 2 is a data flow diagram illustrating the decryption of data. Referring to FIG. 2, in one embodiment, the elements in a decryption process include private key 204, decryption engines 221-222, and encrypted data 220 which further includes partly encrypted data 208, encrypted FEK 209, encrypted encryption attribute 210, third key 233, decryption engine 232, and encrypted third key 237. In one embodiment, private key 204 belongs to a user and is only known to person who has authorization to read/access encrypted data 220.

In one embodiment, encrypted FEK 206 and encrypted encryption attribute 207 are extracted from encrypted data 220. Decryption engine 221 decrypts encrypted FEK 206 with private key 204 to retrieve FEK 202.

In one embodiment, encrypted third key 238 is decrypted by a decryption engine with a user's private key or FEK 236 to retrieve third key 233. Third key 233 is a different key than the user's public key (and the private key) and FEK 202. In one embodiment, decryption engine 232 decrypts encrypted encryption attribute 207 with third key 233 to retrieve encryption attribute 203.

In one embodiment, decryption engine 222 decrypts partly encrypted data 205 with FEK 202 by referring to encryption attribute 203 to identify which segments of partly encrypted data 205 are encrypted. The output of decryption engine 222 is data 201, which may be a text file, a media file, or a data record of a database, or any form of digital information content.

In one embodiment, the overall time for performing the decryption operation is reduced because decryption engine 222 does not need to decrypt all segments of partly encrypted data 205. The increase of performance depends on how many segments of partly encrypted data 205 that are identified for decryption based on the information in encryption attribute 203. In one embodiment, encrypted data 220 is stored on an EFS, or a file system, or is received from another computer system.

In one embodiment, partly encrypted data 205 is segmented into segments where each segment is M-bit in length such that the length equal to one of the block sizes of decryption engines 222. In one embodiment, block ciphers in decryption engine 222 process a 128-bit segment/block in each round of an operation. It will be appreciated by one skilled in the art that, any block size suitable for implementing decryption can be used to determine the length of a segment when segmenting partly encrypted data 205 for the encryption/decryption purpose.

In one embodiment, encryption attribute 203 is the same encryption attribute 105 of FIG. 1. It will be appreciated by one skilled in the art that information in encryption attribute 203 can be represented in different ways to identify which segments of partly encrypted data 205 to decrypt. Different types of data can be protected by encrypting segments of different parts of the data as explained above with reference to FIG. 1. In one embodiment, decryption engine 222 decrypts a plurality of segments, for example: the header of the file, segments of important parts of the file, alternate N segments of the file, or any combinations thereof, which are encrypted to protect from unauthorized access.

In one embodiment, encrypted encryption attribute 210 is appended to partly encrypted data 208. In one embodiment, encrypted encryption attribute 210 prepends partly encrypted data 208. In one embodiment, encrypted encryption attribute 210 is stored at a location associated to partly encrypted data 208 according to the structure of a file system.

In one embodiment, decryption engines 221-222 are able to perform symmetric cryptography operations, asymmetric cryptography operations, or combinations thereof based on various cryptography algorithms (for example, AES, DES, RSA, etc.). The cryptography operations are implemented in block ciphers, stream ciphers, or any other cipher architectures known in the art.

Figure 3:
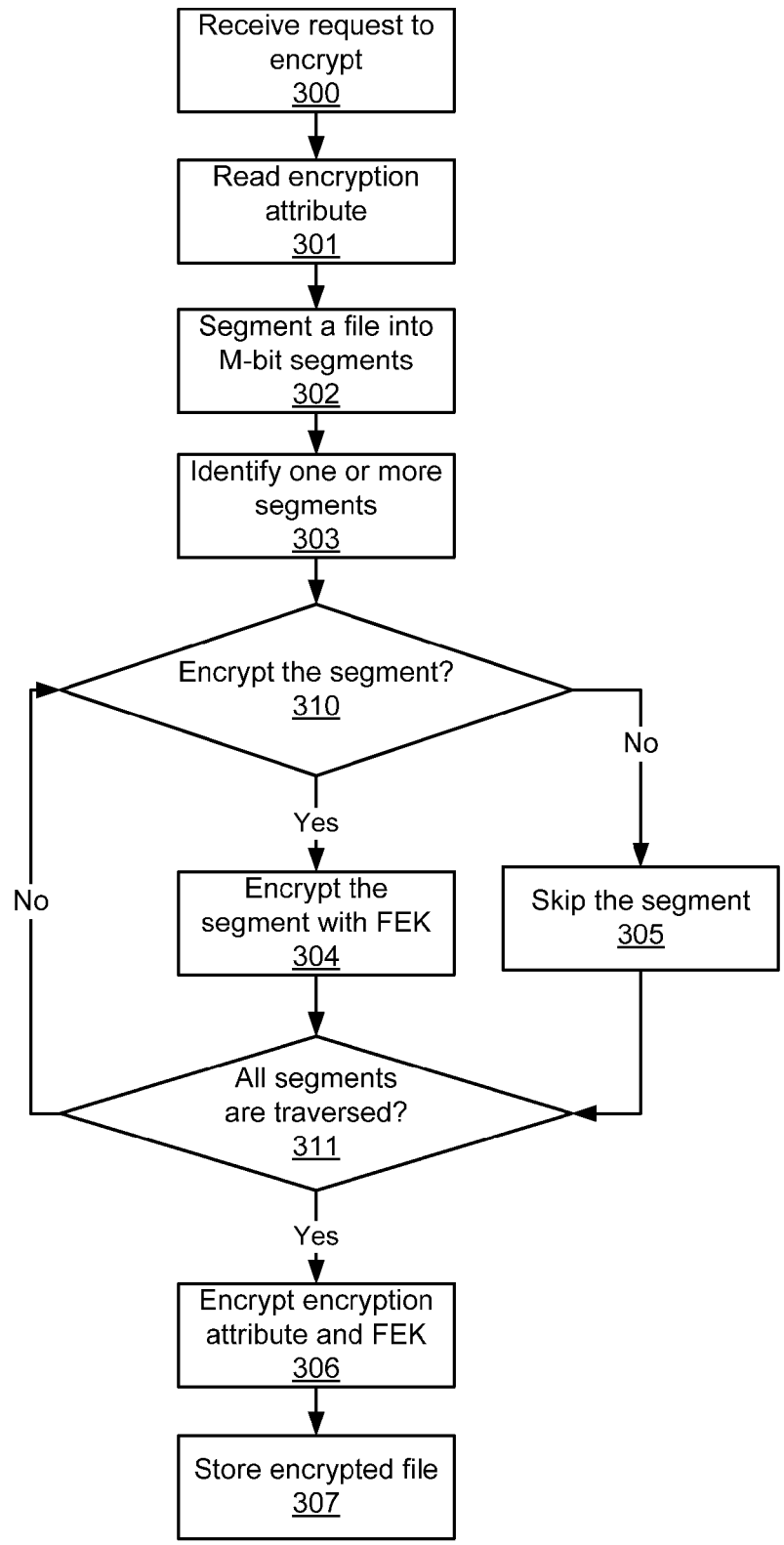
FIG. 3 is a flow diagram of one embodiment of a encryption process

FIG. 3 shows a flow diagram of one embodiment of an encryption process. The process is performed by processing logic that may comprise hardware (circuitry, dedicated logic, etc.), software (such as one that is run on a general purpose computer system or a dedicated machine), or a combination of both. Referring to FIG. 3, in one embodiment, processing logic receives a request to encrypt a file (processing block 300). Processing logic reads an encryption attribute associated with the file (processing block 301). Processing logic segments the file into a plurality of segments (processing block 302) where the length of each segment is suitable for processing by an M-bit encryption engine.

In one embodiment, processing logic identifies one or more segments of the file to encrypt based on the information contained in the encryption attribute (processing block 303). Processing logic determines whether a segment of the file is to be encrypted (processing block 310). If a segment is identified for encryption, an encryption engine encrypts the segment (processing block 304) with a FEK (a symmetric key). Otherwise, the encryption engine does not encrypt the segment (processing block 305). Processing logic repeats the operation for all the segments of the file (processing block 311).

In one embodiment, processing logic encrypts the FEK with a public key (processing block 306). Processing logic encrypts the encryption attribute with a third key. In one embodiment, different encryption engines are used to encrypt the FEK and the encryption attribute.

In one embodiment, processing logic stores the partly encrypted file, the encrypted encryption attribute, and the encrypted FEK in a file (processing block 307). In one embodiment, processing logic transmits the file for use in another computer system. In one embodiment, processing logic stores the partly encrypted file, the encrypted encryption attribute, and the encrypted FEK according to the structure of a file system.

Figure 4:
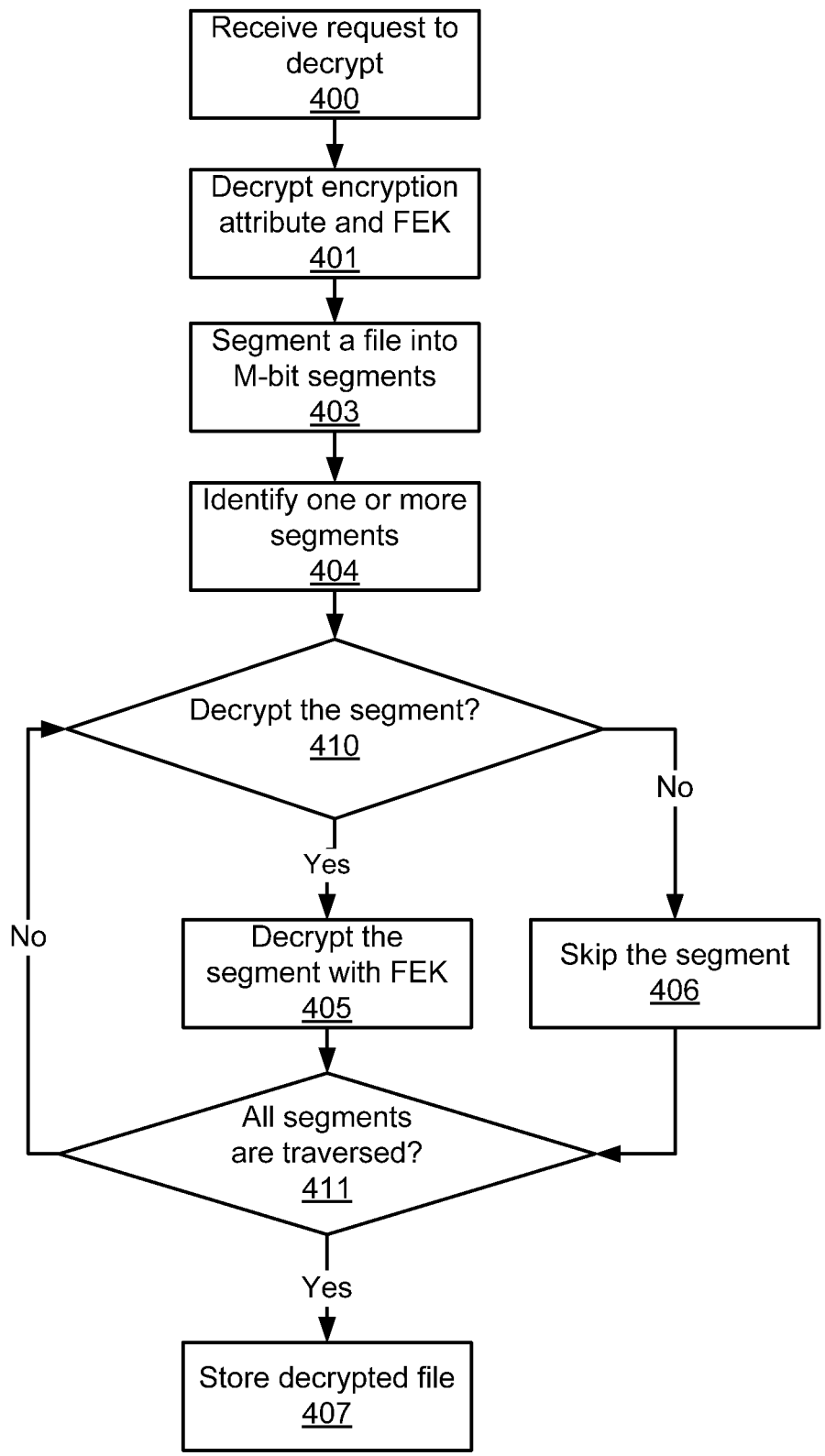
FIG. 4 is a flow diagram of one embodiment of a decryption process.

FIG. 4 is a flow diagram of one embodiment of a decryption process. The process is performed by processing logic that may comprise hardware (circuitry, dedicated logic, etc.), software (such as one that is run on a general purpose computer system or a dedicated machine), or a combination of both. Referring to FIG. 4, in one embodiment, processing logic receives a request to decrypt an encrypted file (processing block 400).

In one embodiment, the encrypted file contains a partly encrypted file, an encrypted encryption attribute associated with the partly encrypted file, and an encrypted FEK. In one embodiment, processing logic decrypts the encrypted encryption attribute to retrieve an encryption attribute (with a third key). Processing logic decrypts the encrypted FEK to retrieve a FEK (processing block 401). Processing logic segments the partly encrypted file into a plurality of segments (processing block 403) where the length of each segment is suitable for processing by an M-bit decryption engine.

In one embodiment, processing logic identifies one or more segments of the partly encrypted file to decrypt based on the information contained in the encryption attribute (processing block 404). Processing logic determines whether a segment of the file has to be decrypted (processing block 410). If a segment is identified for decryption, a decryption engine decrypts the segment with the FEK (processing block 405). Otherwise, the decryption engine does not decrypt the segment (processing block 406). Processing logic repeats the operation for all the segments of the partly encrypted file (processing block 411). Processing logic stores the decrypted file in a file on computer storages (processing block 407).

In one embodiment, processing logic decrypts the encrypted FEK with a private key (processing block 401). Processing logic decrypts the encrypted encryption attribute with a third key. In one embodiment, different decryption engines are used to decrypt the encrypted FEK and the encrypted encryption attribute.

In one embodiment, processing logic receives the partly encrypted file, the encrypted encryption attribute, and the encrypted FEK in a file. In one embodiment, processing logic receives the encrypted file from another computer system. In one embodiment, the partly encrypted file, the encrypted encryption attribute, and the encrypted FEK are stored associatively according to the structure of a file system.

Figure 5:
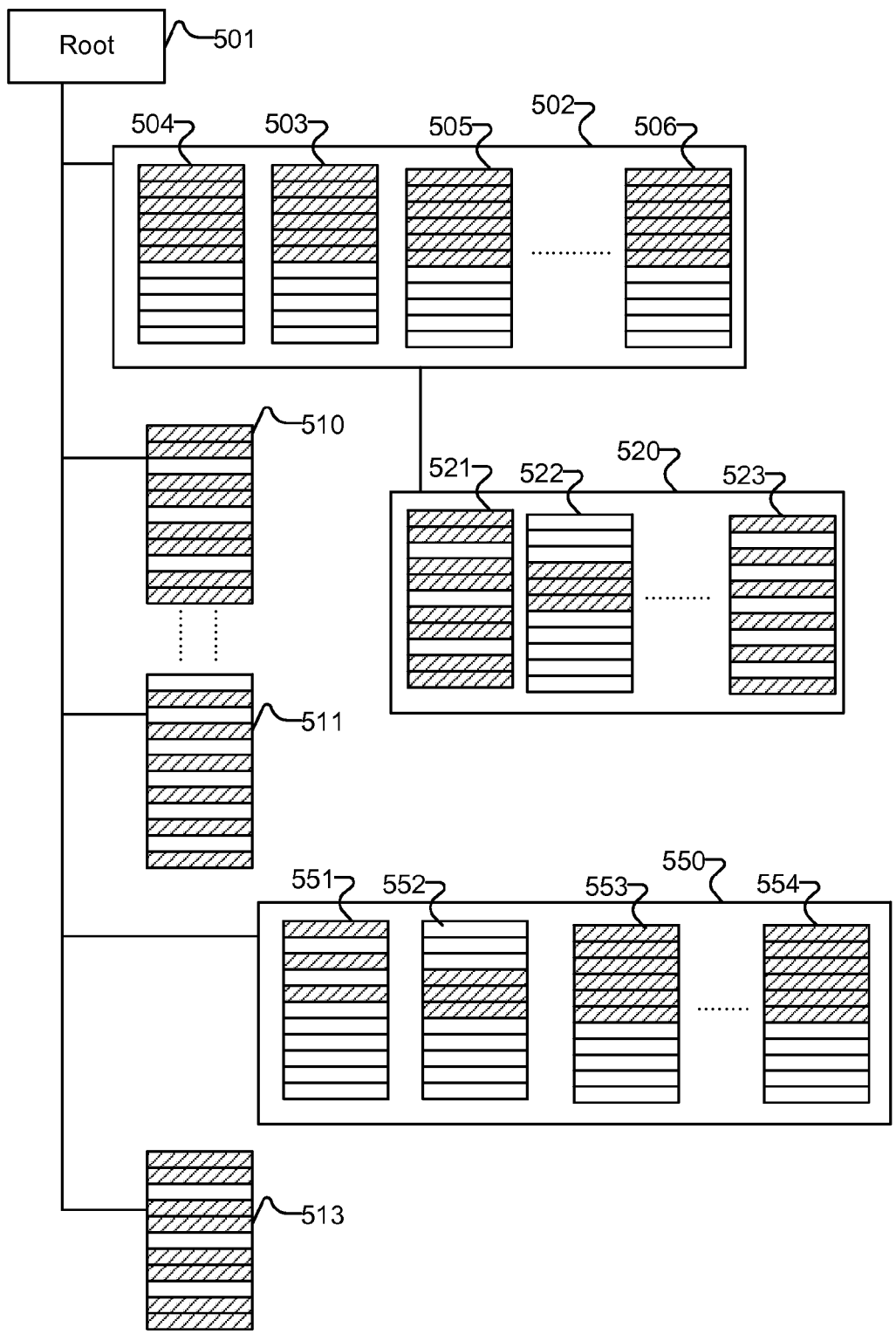
FIG. 5 shows a directory structure in an encrypting file system (EFS) in accordance with one embodiment of the invention.

FIG. 5 shows a directory structure in an encrypting file system (EFS) in accordance with one embodiment of the invention. Referring to FIG. 5, each file comprises a number of segments. Segments indicated with a cross-hatching pattern are encrypted. The encryption attribute and the FEK of a file are not shown in the figure to avoid obscuring the description of the embodiment. The files do not have to be in the same length.

In one embodiment, the file system stores files under root directory 501 or other sub-directories (e. g., directories 502, 550). A sub-directory can further include other sub-directories such as sub-directory 520. In one embodiment, files under a same directory (e.g., root directory 501, directory 520) can be encrypted in different ways. Different segments of file 510, file 511, and file 513 are encrypted based on the encryption attributes associated with each of the file. For example, every alternate segment starting from the second segment of file 511 is encrypted. Two segments of every three segments of file 513 are encrypted. In one embodiment, the files (files 511, 513) are under different categories of file types and are assigned with different encryption attributes. In one embodiment, the files (files 511, 513) are under the same category of file types and the encryption attributes are modified by users.

In one embodiment, files 503-506 in a same directory (directory 502) are encrypted with the same encryption attributes. In one embodiment, files 503-506 are encrypted with the same encryption attributes because the files are under the same category of file types or belong to the same user. In one embodiment, files 551-554 in directory 550 are encrypted with different encryption attributes set by users based on the desired levels of security.

In one embodiment, a file does not have a default encryption attribute. For example, each encryption attribute of files 521-523 is created by users separately. In one embodiment, segments of an important part of file 521 such as, for example: a credit card number, a patient's name, etc., are encrypted. In one embodiment, segments from the header of file 504 are encrypted so that file 504 can not be decoded/read properly based on the encoding information in the header.

FIG. 6 is a block diagram of one embodiment of a cryptography system. Referring to FIG. 6, in one embodiment, a cryptography system comprises controller 600, encryption attribute logic 601, file segmenting logic 603, encryption engine using FEK 610, encryption engine using public keys 611, decryption engine using FEK 630, decryption engine using private keys 631, FEK key generator 606, and third key logic 633. In one embodiment, storage drive 620 and non-volatile disk 621 stores the files operated on by the cryptography system. In one embodiment, storage drive 620 and non-volatile disk 621 are managed by controller 600. In one embodiment, controller 600 runs an operating system with services to manage storage drive 620 and non-volatile disk 621.

In one embodiment, controller 600 receives a file to encrypt. Encryption attribute logic 601 accesses the encryption attribute of the file. In one embodiment, encryption attribute logic 601 assigns an encryption attribute to a file based on the file type. In one embodiment, an encryption attribute is stored in association with the file. Encryption attribute logic 601 determines which segments of a file to encrypt based on the information in the encryption attribute.

In one embodiment, file segmenting logic 603 segments the file into a plurality of segments. Each segment is M-bit in length corresponds to one of the block sizes of encryption engine using FEK 610. Encryption engine using FEK 610 encrypts the segments identified by encryption attribute logic 601 in conjunction with file segmenting logic 603. In one embodiment, encryption engine using FEK 610 is an M-bit encryption engine implementing symmetric cryptography algorithms. In one embodiment, encryption engine using public keys 611 encrypts the FEK with a public key. In one embodiment, encryption engine using public keys 611 performs asymmetric cryptography algorithms. In one embodiment, third key logic 633 uses a third encryption key to encrypt the encryption attribute.

In one embodiment, controller 600 stores the partly encrypted data, the encrypted third key, the encrypted encryption attribute and the encrypted FEK to a file on storage drive 620. In one embodiment, controller 600 stores the partly encrypted data, the encrypted encryption attribute, the encrypted FEK, the encrypted third key or the combinations thereof to different locations (of a file system) that are associated to each others by the file system.

In one embodiment, controller 600 receives a file to decrypt. The file includes a partly encrypted file, an encrypted encryption attribute associated with the file, and an encrypted FEK. In one embodiment, decryption engine using private keys 631 decrypts the encrypted FEK to generate an FEK. In one embodiment, decryption engine using private keys 631 performs asymmetric cryptography algorithms. In one embodiment, third key logic 633 decrypts the encrypted encryption attribute with a third encryption key to generate an encryption attribute.

In one embodiment, encryption attribute logic 601 determines which segments of the partly encrypted file to decrypt based on the information in encryption attribute. In one embodiment, file segmenting logic 603 segments the partly encrypted file into a plurality of segments. Each segment is M-bit in length corresponds to one of the block sizes of decryption engine using FEK 630. Decryption engine using FEK 630 decrypts the segments identified by encryption attribute logic 601 in conjunction with file segmenting logic 603. In one embodiment, decryption engine using FEK 630 is an M-bit decryption engine implementing symmetric cryptography algorithms.

In one embodiment, controller 600 stores the decrypted file, the encryption attribute, and the FEK to a file on storage drive 620. In one embodiment, controller 600 stores the decrypted file, the encryption attribute, the FEK, or the combinations thereof to different locations (of a file system) that are associated to each others by the file system.

In one embodiment, FEK key generator 606 generates a series of keys based on the initial FEK for different rounds in encryption engine using FEK 610.

Although described herein as processing logic, each logic unit, each encryption engine, and each decryption engine can be implemented independently, separately or externally in different combinations. Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 7 illustrates a computer system in which one embodiment of the invention may be used. A processor 705 accesses data from a level 1 (L1) cache memory 706, a level 2 (L2) cache memory 710, and main memory 715. In other embodiments of the invention, the cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have the cache memory 710 as a shared cache for more than one processor core.

The processor 705 may have any number of processing cores. Other embodiments of the invention, however, may be implemented within other devices within the system or distributed throughout the system in hardware, software, or some combination thereof.

In one embodiment, main memory 715 loads operating system 750 to provide a file system via application programming interfaces (APIs). The file system connects through a device driver to communicate with solid state disk 725, HDD 720, or both. In one embodiment, main memory 715 loads an application program that interfaces with operating system 750 and the file system through APIs. The file system connects through a device driver to communicate with solid state disk 725 or HDD 720 to manage the files thereon. In one embodiment, the file system contains methods for (1) storing, referencing, sharing, and securing files, (2) accessing file data, and (3) maintaining file integrity. Notwithstanding, there is not always a clear distinction between a file system and its associated operating system, particularly with those file systems contained within an operating system.

The main memory 715 may be implemented in various memory sources, such as dynamic random-access memory (DRAM), a hard disk drive (HDD) 720, a solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
  encrypting, via a processing device, one or more segments of first data using a first key, the first data being associated with at least one encryption attribute and having a plurality of segments, wherein the encryption attribute includes information identifying the one or more segments selected for encryption, wherein the information includes one or more of a set of numbers corresponding to the one or more segments, one or more rules relating to the one or more segments, an identifier corresponding to the one or more rules, and a pointer to a location storing the one or more rules, wherein encrypting of the one or more segments facilitates lowering overall encryption time by limiting the encryption to the one or more segments of the plurality of segments, wherein the one or more segments are identified as candidates for encryption;
  encrypting the first key using a second key, wherein the second key is a public key;
  encrypting the encryption attribute using a third key to create an encrypted encryption attribute; and
  storing, at a memory coupled with the processing device, at least a part of second data, wherein the part includes at least one of partly encrypted data and the encrypted encryption attribute.

2. The method defined in claim 1, wherein the one or more segments comprise the first N segments of the first data, wherein N is a positive integer, wherein each segment of the plurality of segments is M-bit in length such that the length is equal to one of block sizes of an M-bit encryption engine, and wherein each segment is processed by the M-bit encryption engine.

3. The method defined in claim 1, wherein the one or more segments comprise at least one segment of every N segments of the first data, wherein N is a positive integer.

4. The method defined in claim 1, wherein the encryption attribute is based on a file type of the first data.

5. The method defined in claim 1, wherein the encryption attribute has a default setting and is modifiable by a user.

6. The method defined in claim 1, further comprising segmenting the first data into the plurality of segments, wherein each segment of the first data is M-bit in length and each segment can be processed by an M-bit encryption engine.

7. The method defined in claim 1, wherein the third key is further encrypted using the first key to generate another encrypted version of the third key, wherein the encryption attribute is based on a file type of the data or a categorization of the data, and wherein the encryption attribute comprises a user-defined attribute or a default setting that is modifiable by a user, wherein the encryption attribute is associated with a file to identify two or more segments of the file that are to be subsequently encrypted during the encryption process.

8. A method for decrypting comprising:
  accessing, via a processing device, first data including partly encrypted data, an encrypted encryption attribute, an encrypted version of a first key that is encrypted using a second key, and an encrypted version of a third key, wherein the partly encrypted data comprises a plurality of segments;

decrypting, via the processing device, the encrypted encryption attribute using the third key to retrieve an encryption attribute, wherein the encryption attribute includes information to identify one or more segments of the plurality of segments of the partly encrypted data that are encrypted, wherein the information further includes one or more of a set of numbers corresponding to the one or more segments, one or more rules relating to the one or more segments, an identifier corresponding to the one or more rules, and a pointer to a location storing the one or more rules;

decrypting the one or more segments of the partly encrypted data using the first key, wherein decrypting of the one or more segments facilitates lowering overall encryption time by limiting the decryption to the one or more segments of the plurality of segments, wherein the one or more segments are identified as candidates for decryption; and decrypting an encrypted version of the second key using the third key, wherein the first data further includes the encrypted version of the second key, wherein the first key and the second key are identical symmetric encryption keys, and wherein the third key is a private key.

9. A system for encrypting comprising:

a controller to receive a request to encrypt first data associated with at least one encryption attribute, wherein the first data includes a plurality of segments including the one or more segments, wherein the encryption attribute includes information identifying one or more segments of the plurality of segments based on one or more rules describing each of the one or more segments selected for encryption, wherein the information includes one or more of a set of numbers corresponding to the one or more segments, one or more rules relating to the one or more segments, an identifier corresponding to the one or more rules, and a pointer to a location storing the one or more rules, wherein encrypting of the one or more segments facilitates lowering overall encryption time by limiting the encryption to the one or more segments of the plurality of segments, wherein the one or more segments are identified as candidates for encryption;

a first encryption engine to encrypt the one or more segments of the first data using a first key to produce partly encrypted data, wherein the first key is to be encrypted using a second key, wherein the second key is a public key;

a second encryption engine to encrypt the encryption attribute using a third key to create an encrypted encryption attribute; and a storage to store at least a part of second data, wherein the part includes at least one of the encrypted encryption attribute and the partly encrypted data.

10. The system defined in claim 9, wherein the third key is using the second key to generate an encrypted version of the third key, wherein the encryption attribute is based on a file type of the data or a categorization of the data, and wherein the encryption attribute comprises a user-defined attribute or a default setting that is modifiable by a user, wherein the encryption attribute is associated with a file to identify two or more segments of the file that are to be subsequently encrypted during the encryption process.

11. A system for decrypting comprising:

a controller to access first data including partly encrypted data and an encrypted encryption attribute, wherein the partly encrypted data comprises a plurality of segments, wherein the partly encrypted data is encrypted using a first key, wherein the first key is encrypted using a second key to generate an encrypted version of the first key;

a first decryption engine to decrypt the encrypted encryption attribute using a third key to retrieve the encryption attribute, wherein the encryption attribute includes information to identify one or more segments of the plurality of segments of the partly encrypted data that are encrypted, wherein the information further includes one or more of a set of numbers corresponding to the one or more segments, one or more rules relating to the one or more segments, an identifier corresponding to the one or more rules, and a pointer to a location storing the one or more rules, wherein the one or more segments are identified as candidates for encryption; and a second decryption engine to decrypt the one or more segments of the partly encrypted data using a first key, wherein decrypting of the one or more segments facilitates lowering overall encryption time by limiting the decryption to the one or more segments of the plurality of segments, wherein the one or more segments are identified as candidates for decryption, wherein the second decryption engine is further to decrypt an encrypted version of the second key using the third key, wherein the first data further includes the encrypted version of the second key, and wherein the first key and the second key are identical symmetric encryption keys, and wherein the third key is a private key.

12. At least one non-transitory machine-readable medium including data storing instructions thereon that, when accessed by a machine, cause the machine to perform a method comprising:

selectively encrypting one or more segments of first data with a first key, the first data is associated with at least one encryption attribute and having a plurality of segments, wherein the encryption attribute includes information identifying the one or more segments selected for encryption, wherein the information further includes one or more of a set of numbers corresponding to the one or more segments, one or more rules relating to the one or more segments, an identifier corresponding to the one or more rules, and a pointer to a location storing the one or more rules, wherein encrypting of the one or more segments facilitates lowering overall encryption time by limiting the encryption to the one or more segments of the plurality of segments based on one or more rules describing each of the one or more segments as candidates for encryption;

encrypting the first key using a second key to generate an encrypted version of the first key, wherein the second key is a public key;

encrypting the encryption attribute using a third key to create an encrypted encryption attribute; and storing at least a part of second data, wherein the part includes at least one of partly encrypted data, an encrypted encryption attribute, and the encrypted version.

13. The non-transitory machine-readable medium of claim 12, wherein the third key is encrypted using the first key to generate an encrypted version of the third key, wherein the encryption attribute is based on a file type of the data or a categorization of the data, and wherein the encryption attribute comprises a user-defined attribute or a default setting that is modifiable by a user, wherein the encryption attribute is associated with a file to identify two or more segments of the file that are to be subsequently encrypted during the encryption process.

14. The non-transitory machine-readable medium of claim 13, wherein the third key is further encrypted using the second key to generate another encrypted version of the third key, wherein the one or more segments include one or more first N segments representing a header of a file such that the header is encrypted to protect the file against unauthorized usages, wherein the header holds data relating to one or more security measures for protecting the file, wherein the one or more security measures include one or more of parameters relating to a video encoding algorithm, parameters associated with an image encoding algorithm, and data fields of a data structure.

15. At least one non-transitory machine-readable medium including data storing instructions thereon that, when accessed by a machine, cause the machine to perform a method comprising:

accessing first data including partly encrypted data, an encrypted encryption attribute, an encrypted version of a first key that is encrypted by using a second key, and encrypted versions of a third key, wherein the partly encrypted data comprises a plurality of segments;

decrypting the encrypted encryption attribute using the third key to retrieve the encryption attribute, wherein the encryption attribute includes information to identify one or more segments of the plurality of segments of the partly encrypted data that are encrypted, wherein the information further includes one or more of a set of numbers corresponding to the one or more segments, one or more rules relating to the one or more segments, an identifier corresponding to the one or more rules, and a pointer to a location storing the one or more rules;

decrypting the one or more segments of the partly encrypted data using the first key, wherein decrypting of the one or more segments facilitates lowering overall encryption time by limiting the decryption to the one or more segments of the plurality of segments, wherein the one or more segments are identified as candidates for decryption; and decrypting an encrypted version of the second key using the third key, wherein the first data further includes the encrypted version of the second key, and wherein the first key and the second key are identical symmetric encryption keys, and the wherein third key is a private key.

16. The non-transitory machine-readable medium of claim 15, wherein an encrypted version of the third key is generated using the second key, wherein the one or more segments include one or more first N segments representing a header of a file such that the header is encrypted to protect the file against unauthorized usages, wherein the header holds data relating to one or more security measures for protecting the file, wherein the one or more security measures include one or more of parameters relating to a video encoding algorithm, parameters associated with an image encoding algorithm, and data fields of a data structure.

\* \* \* \* \*